Feb. 5, 1929.                                      1,701,448
K. F. GALLIMORE ET AL
LOADING DEVICE FOR WORKHOLDERS
Filed Nov. 16, 1925
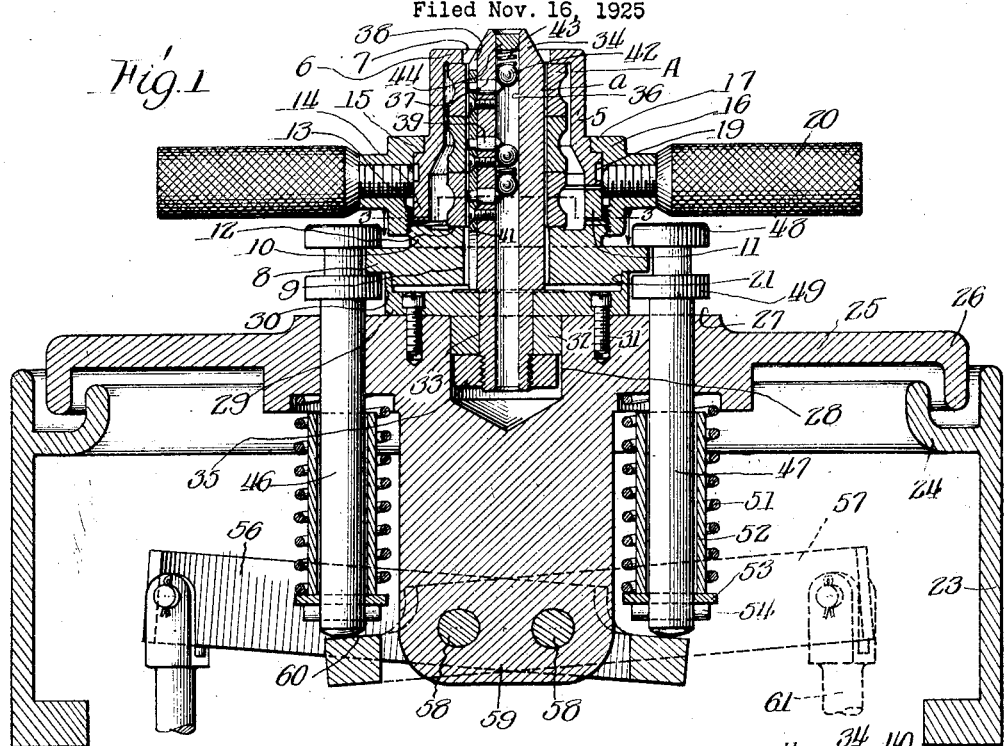
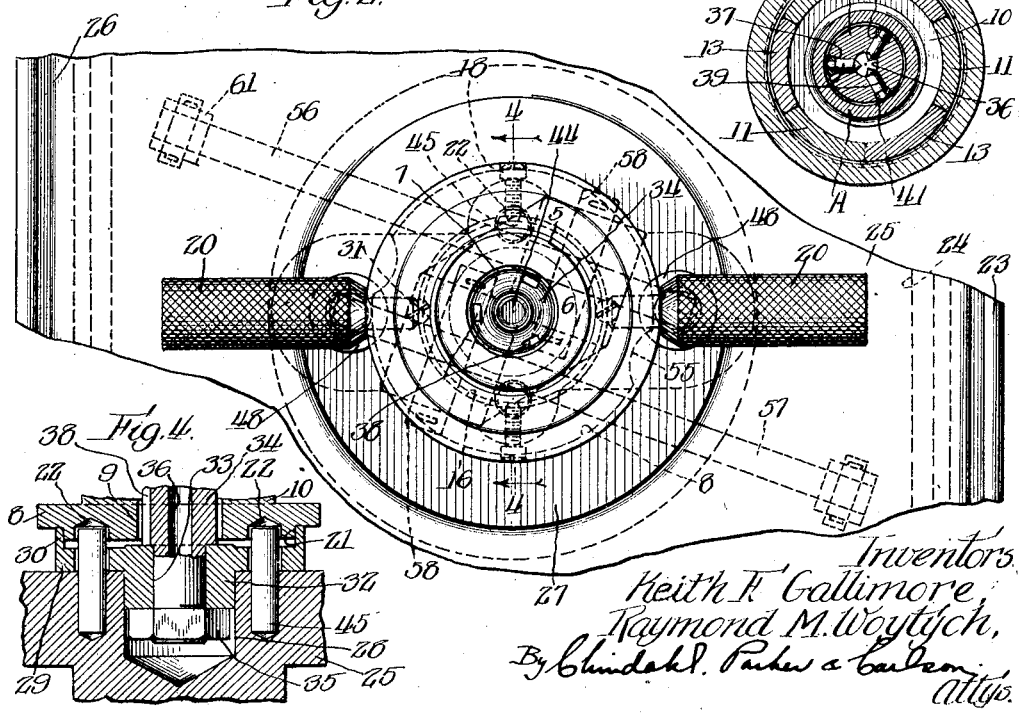
Inventors
Keith F. Gallimore,
Raymond M. Woytych,
By Chindahl, Parker & Carlson
Attys.

Patented Feb. 5, 1929.

1,701,448

UNITED STATES PATENT OFFICE.

KEITH F. GALLIMORE AND RAYMOND M. WOYTYCH, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS.

LOADING DEVICE FOR WORK HOLDERS.

Application filed November 16, 1925. Serial No. 69,367.

The invention relates to improvements in loading devices for portable workholders, and particularly to a device of this character which serves to center the work blanks in the workholder and to hold the workholder against displacement while the work blanks are being clamped in centered position.

The objects of the invention are to provide a novel loading device for workholders which is adapted in one operation to center one, two or more work blanks; which comprises a centering means adapted to yieldingly engage the work blanks, thereby compensating for irregularities and for differences in size; which comprises means for accurately positioning and securely clamping the workholder; which is accurate and positive in operation, and simple and inexpensive in construction; and which can be easily and quickly manipulated.

Further objects and advantages will become apparent as the description proceeds.

In the accompanying drawings, Figure 1 is a vertical sectional view of a loading device embodying the features of our invention, and of one type of workholder mounted thereon.

Fig. 2 is a fragmentary plan view.

Fig. 3 is a sectional view of the workholder taken along line 3—3 of Figure 1.

Fig. 4 is a fragmentary sectional view taken along line 4—4 of Fig. 2.

While the invention is susceptible of various modifications and alternative constructions, we have shown in the drawings and will herein describe in detail the preferred embodiment thereof, but it is to be understood that we do not thereby intend to limit the invention to the specific form disclosed, but intend to cover all modifications and alternative constructions falling within the spirit and scope of the invention as expressed in the appended claims.

Referring to the drawings, we have shown a portable workholder or shuttle which is adapted to be mounted with a plurality of centered work blanks in a suitable chuck (not shown). It is to be understood, however, that various other types of workholders may be served by the loading device. The workholder comprises a hollow cylindrical body section 5 which is adapted to receive a plurality of work blanks A having bores $a$ to be ground. The work blanks A when positioned in the workholder abut end to end, and are slightly spaced peripherally from the sides of the body section 5 to permit centering. One end of the body section 5 is formed with an annular radial flange 6 which serves to engage the outer end of and to true up the adjacent work blank, and which defines a central opening 7 somewhat larger than the bores $a$. To clamp the work blanks A against the flange 6, a removable clamping plate 8 is provided which when in position closes the other end of the body section 5, and which is formed with a central opening 9 also somewhat larger than the bores $a$. The clamping plate 8 is formed with an annular flange 10 which is threaded externally, and which is provided with a plurality of spaced end clutch teeth 11, and is also formed with an annular bearing rib 12 about the opening 9 to engage the end of the adjacent work blank. The teeth 11 are adapted to interlock with similar clutch teeth 13 formed on the adjacent end of the body section 5 to prevent relative rotation of the two parts.

The end of the body section 5 next to the clamping plate 8 is formed with an enlarged portion 14 defining a circumferential shoulder 15. Rotatably mounted on the enlarged portion 14 is an annular clamp nut 16, one end of which has a radial flange 17 fitting over the shoulder 15, and the other end of which is adapted to be threaded over the flange 10 of the clamping plate 8. The clamp nut 16 is held against axial movement by a plurality of inwardly extending screws 18, the ends of which engage in an annular groove 19 in the periphery of the enlarged portion 14. A pair of handles 20 is provided on the nut 16 to facilitate adjustment of the latter.

The outer face of the clamping plate 8 is formed with a circular groove 21 which is concentric with the axis of rotation, and which is adapted to cooperate with other means to locate the workholder in centered position in the chuck or on the loading device. A pair of diametrically spaced holes 22 is also formed in the outer face of the clamping ring 8 for a purpose to be hereinafter described.

The loading device in the exemplary form comprises a hollow base section 23 which is adapted to be mounted on a suitable support (not shown). The base section 23 is open at its upper end, and is formed along the inside of the upper edge with a trough 24. A table or base plate 25 is supported on the base section 23, and is formed with a downwardly extending flange 26 which projects into the trough 24. Formed centrally on the base plate 25 is a smooth raised surface 27 having a centrally located bore 28. Resting on the surface 27 is a centering plate 29 having an upstanding annular centering flange 30 adapted to fit into the centering groove 21 of the workholder to center the latter with reference to the bore 28. The plate 29 is held in place by a plurality of screw bolts 31, and is formed with a central hub 32 fitting snugly into the bore 28 and having a concentric bore 33. Extending through the bore 33 is the reduced lower end of a stationary upstanding centering plug 34. A nut 35 is threaded onto the lower end of the centering plug 34 to secure it to the plate 29.

The centering plug is positioned to extend axially through the openings 7 and 9 of the workholder, and through the bores a of the work blanks. To facilitate positioning the work blanks over the centering plug 34 the upper end of the latter is beveled. Extending longitudinally through the centering plug 34 is a bore 36 from which a plurality of sets of bores 37 radiate. In the present instance three sets of three bores 37 each, are provided. Three longitudinal grooves 38 are formed in the periphery of the centering plug 34, and intersect with the outer ends of the bores 37. Slidably mounted in the bores 37 are a plurality of centering pins 39, one for each bore. The inner end of each pin is pointed, and the outer end is reduced in size to provide a shoulder 40 and is rounded. The reduced ends of the pins 39 extend through holes in strips 41 positioned in the grooves 38, and the shoulders 40 are adapted to abut against the strips to limit the outward movement of the pins. Coacting with the pointed ends of the pins are a plurality of balls 42, one for each set of pins. These balls are positioned in the bore 36, and are pressed against the ends of the pins by coiled springs 43. Two balls may be actuated by a single spring 43 as shown in the middle of the centering plug 34. The upper end of the bore 36 is closed by a removable plug 44 against which abuts the spring 43 for the odd set of centering pins.

It will be evident that the work blanks are centered in the workholder by positioning the latter on the loading device. To secure the workholder against rotation while clamping the work blanks in centered position, a pair of diametrically opposed pins 45 adapted to engage in the holes 22 in the clamping plate 8 is provided on the plate 29 (see Figure 4). The workholder is adapted to be held on the loading device by means of a pair of clamping members 46 and 47 which are vertically reciprocable in the plate 25. Each of the clamping members is formed on its upper end with two spaced heads or enlargements 48 and 49 adapted to embrace the outer edges of the clamping plate 8, and is pressed downwardly by a coil spring 51 to clamp the workholder to the plate 29. Each of the springs 51 encircles a sleeve 52 loosely mounted on the lower end of the clamping member, and abuts at its upper end against the underside of the base plate 25 and at its lower end against a ring washer 53 held on the clamping member by a pin 54. The clamping plate 8 is formed in its periphery with a pair of diametrically opposed segmental notches 55. To mount the clamping plate on the loading device, these notches are positioned in alinement with the heads 48 and 49 and are moved over the heads 48. The clamping plate is then rotated to move the notches 55 out of registration with the heads 48.

The clamping members 46 and 47 are adapted to be raised against the force of the springs 51 through the agency of a pair of levers 56 and 57 to permit positioning of the clamping plate or removal of the workholder. These levers are pivoted on pins 58 in a depending bracket 59 on the base plate 25, and extend to opposite sides of the bracket 59. Of the levers, the short inner ends are cut away at 60 to engage the rounded lower ends of the clamping members 47 and 46 respectively, and the outer ends are pivotally secured to a pair of connecting rods 61 which are adapted to be actuated through any suitable means, such as a foot treadle (not shown).

In operation, the clamping plate 8 is mounted on the loading device and the work blanks are positioned on the centering plug 34. The base section 5 is then positioned on the clamping plate 8, and the nut 16 is tightened. The clamping members 46 and 47 are now raised, whereupon the loaded workholder can be removed.

We claim as our invention:

1. A loading device for workholders having, in combination, a base, a plate on said base, said plate having a central bore, a centering plate on said first mentioned plate and fitting into said bore, said centering plate having a centering flange concentric with said bore and adapted to receive and position a workholder, a work centering plug rigidly secured to said centering plate and extending axially of said bore, and means for clamping the work holder to said centering plate.

2. A loading device for workholders having, in combination, a support, a work centering plug mounted on said support, means on said support for centering a workholder with reference to said plug, the latter being adapted to engage the work and center the same in the workholder, and means for holding said workholder and said support against relative rotation.

3. A loading device for workholders having, in combination, a supporting plate, a fixed work centering member on said plate, and means for locating a workholder relative to said centering member, the workholder being mounted on said member and said member being adapted to engage the work to locate it relative to said workholder.

4. A loading device for workholders having, in combination, a supporting plate, a centering plug on said plate, means on said plate adapted to position a workholder in centered relation to said plug, and a plurality of members movably mounted in the periphery of said centering plug for engaging the work to center the latter in the workholder.

5. A loading device for workholders having, in combination, a supporting plate adapted to support a workholder, centering means on said plate adapted to center the work in the workholder, means for holding the workholder in position on said supporting plate while the work blanks are released or clamped in position, and operating means for quickly releasing said last named means.

6. A loading device for workholders having, in combination, a support for a workholder, fixed work centering means on said support adapted to enter the workholder to center the work, and means for positioning said workholder on said support in predetermined relation to said centering means.

7. A workholder having, in combination, a support, centering means on said support for centering the work in said workholder, a plurality of clamping members mounted in said support, resilient means for moving said clamping members to clamp said workholder to said support, and means for actuating said clamping members to release said workholder.

In testimony whereof we have hereunto affixed our signatures.

KEITH F. GALLIMORE.
RAYMOND M. WOYTYCH.